(12) United States Patent
Mattos et al.

(10) Patent No.: US 10,988,369 B2
(45) Date of Patent: Apr. 27, 2021

(54) REFUELLING ARRANGEMENT

(71) Applicant: I6 GROUP LIMITED, Farnborough (GB)

(72) Inventors: Alexander Mattos, Farnborough (GB); Steven Uhrmacher, Farnborough (GB); Robert Holmes, Farnborough (GB)

(73) Assignee: I6 GROUP LIMITED, Farnborough (GB)

( * ) Notice: Subject to any disclaimer, the term of this patent is extended or adjusted under 35 U.S.C. 154(b) by 0 days.

(21) Appl. No.: 16/064,976

(22) PCT Filed: Nov. 18, 2016

(86) PCT No.: PCT/GB2016/053605
§ 371 (c)(1),
(2) Date: Jun. 21, 2018

(87) PCT Pub. No.: WO2017/109452
PCT Pub. Date: Jun. 29, 2017

(65) Prior Publication Data
US 2018/0370788 A1    Dec. 27, 2018

(30) Foreign Application Priority Data

Dec. 22, 2015   (GB) ..................................... 1522593

(51) Int. Cl.
*B67D 7/14*         (2010.01)
*B64F 1/28*         (2006.01)
(Continued)

(52) U.S. Cl.
CPC ................ *B67D 7/145* (2013.01); *B64F 1/28* (2013.01); *B67D 7/04* (2013.01); *B67D 7/08* (2013.01)

(58) Field of Classification Search
CPC .............. B67D 7/145; B67D 7/04; B64F 1/28
See application file for complete search history.

(56) References Cited

U.S. PATENT DOCUMENTS 6,175,382 B1   1/2001 Mohr
6,950,627 B2 *  9/2005 Vicari ................ H04B 7/18506
                                                    455/41.2
(Continued)

FOREIGN PATENT DOCUMENTS

DE          2314728 A1    8/1974
DE    202012009281 U1    1/2014
(Continued)

OTHER PUBLICATIONS

NPL—BX AIR 767 Fueling Procuedures Manual (Year: 2019).*
(Continued)

*Primary Examiner* — Jessica Cahill
*Assistant Examiner* — Christopher M Afful
(74) *Attorney, Agent, or Firm* — Andrus Intellectual Property Law, LLP

(57) ABSTRACT

A refuelling method having instructing a refuelling operator to dispense a quantity of fuel to, and maintaining, during dispensing of the fuel, at least intermittent, substantially real time communication with an officer responsible for the aircraft to advise the officer of the status of the refuelling process. A system having a refuelling module and an officer module, the refuelling module configured to receive instructions to dispense a quantity of fuel to an aircraft, an at least intermittent, substantially real time communications link being maintained between the refuelling module and the officer module during dispensing of fuel to the aircraft, the refuelling module being adapted to transmit to the officer module information relating to the status of the refuelling process, and the officer module being adapted to display to an output indicative of the status of the refuelling process. The method and system permits modification of the instruction during refuelling.

12 Claims, 1 Drawing Sheet

(51) Int. Cl.
  *B67D 7/04* (2010.01)
  *B67D 7/08* (2010.01)

(56) References Cited

U.S. PATENT DOCUMENTS

| | | | |
|---|---|---|---|
| 7,376,495 B2 | 5/2008 | Coggins | |
| 7,957,735 B1 * | 6/2011 | Lee | H04B 7/18506 |
| | | | 455/431 |
| 8,381,779 B1 * | 2/2013 | Wyler | B64F 1/28 |
| | | | 141/94 |
| 2012/0173072 A1 * | 7/2012 | Portocalis | G06Q 10/06 |
| | | | 701/29.3 |
| 2012/0284075 A1 * | 11/2012 | Blagg | G06Q 10/06 |
| | | | 705/7.13 |

FOREIGN PATENT DOCUMENTS

| | | | | |
|---|---|---|---|---|
| EP | 1595789 A1 | 11/2005 | | |
| EP | 1595789 B1 * | 4/2009 | | B64D 37/00 |
| WO | 2005069944 A2 | 8/2005 | | |
| WO | 2012170672 A1 | 12/2012 | | |
| WO | WO-2012170672 A1 * | 12/2012 | | B64F 1/28 |

OTHER PUBLICATIONS

U.S. Navy Technical Manual Checklist TO 00-25-172CL-3 (Hot Refueling of U.S. Navy Aircraft) (Year: 2016).*
U.S. Department of Transportation Federal Aviation Administration Advisory Circular 91-32B, Appendix 2 (Year: 1997).*
U.S. Army Tactical Procedure 3-04.17, Techniques for Forward Arming and Refueling Points (Year: 2018).*
PCT/GB2016/053605 International Search Report, dated Mar. 3, 2017, 3 pages.

* cited by examiner

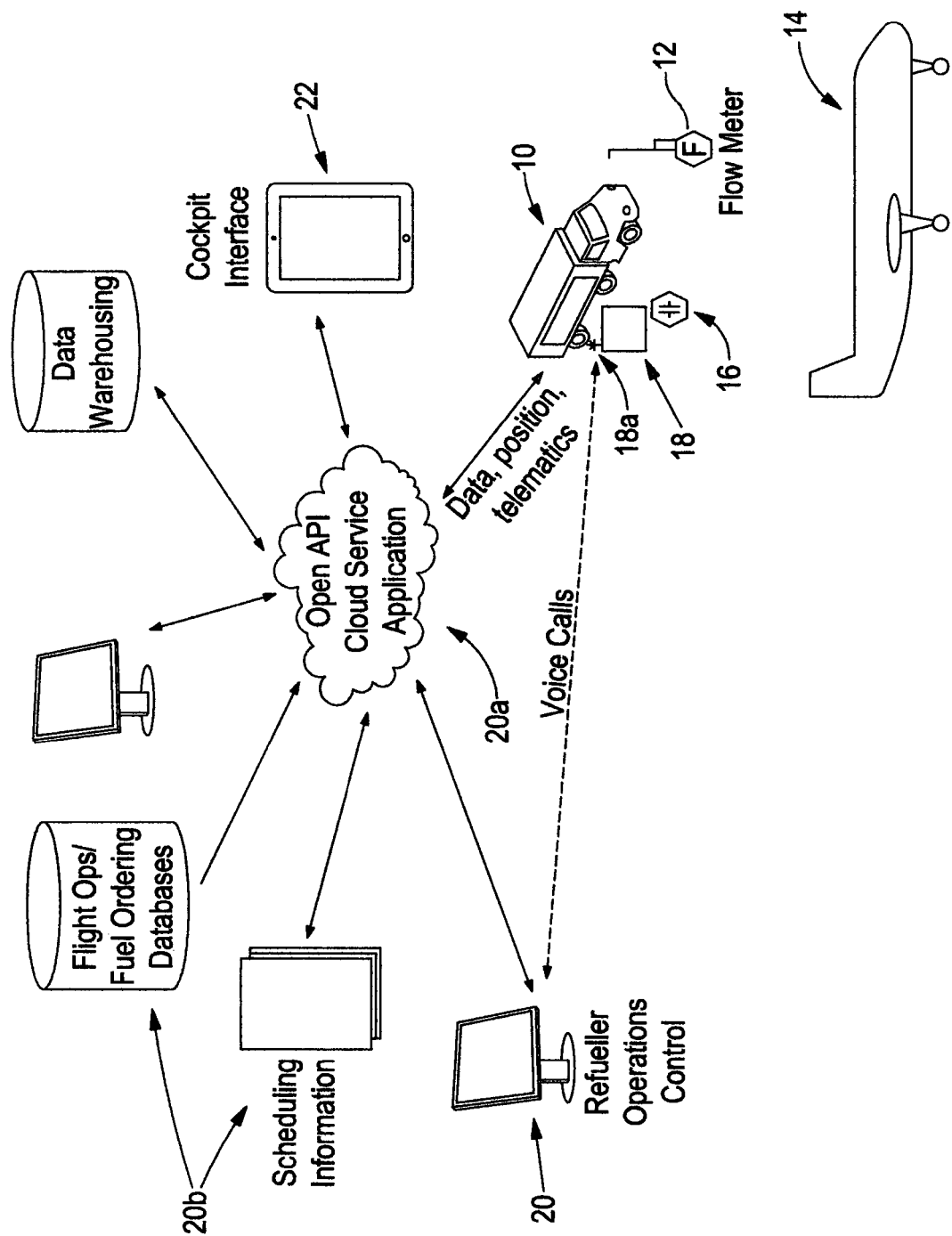

# REFUELLING ARRANGEMENT

CROSS-REFERENCE TO RELATED APPLICATION

This application is the U.S. national phase of PCT Application No. PCT/GB2016/053605 filed on Nov. 18, 2016, which claims priority to GB Patent Application No. 1522593.1 filed on Dec. 22, 2015, the disclosures of which are incorporated in their entirety by reference herein.

This invention relates to a refuelling arrangement, for example for use in the refuelling of aircraft, trains, ships or the like, and in particular to a refuelling system and to a refuelling method, the use of which can result in enhanced fuelling accuracy and reduce inefficiencies. Whilst suitable for use in a wide range of applications, for the most part the description herein relates to the refuelling of aircraft. It will be appreciated, however, that the invention is not restricted in this regard.

Aircraft refuelling equipment in use in airports around the world typically take the form of bowsers, ie fuel tankers equipped with pumps for supplying fuel to the aircraft and metering arrangements, or fuel hydrant dispenser arrangements whereby a volume of fuel dispensed from the tanker or fuel hydrant to the aircraft can be monitored. Before commencement of fuelling, the refuelling agent is notified of how much fuel to dispense to the aircraft taking into account factors such as the flight plan to be followed by the aircraft, and hence how much fuel is required in order for the aircraft to safely reach its destination, the load to be carried by the aircraft, residual fuel within the aircraft tanks and other information. Once provided with this information, the refuelling operator operates the refuelling equipment to dispense to the aircraft the required volume of fuel. Upon completion of refuelling, the refuelling operator will disconnect the refuelling equipment from the aircraft, and will notify the pilot that refuelling has been completed, advising the quantity of fuel that has been dispensed. The notification that refuelling has been completed takes place face-to-face, and typically involves passing to the pilot a print-out confirming that refuelling has been completed and providing information regarding the volume of fuel dispensed.

Sometimes, for example as a result of a significant change in the load to be carried by the aircraft, the route it is to follow, or the like, the pilot will then advise the refuelling operator that additional fuel is required. Upon being notified that additional fuel is required, the refuelling operator will recommence fuelling. This requires reconnection of the refuelling equipment to the aircraft, dispensing of the additional volume of fuel, disconnection of the equipment and then again notifying the pilot of completion of the refuelling process. These steps can take a considerable amount of time, and may result in delayed departure of the aircraft. On occasion, the pilot may decide that less fuel than initially instructed is required, in which case he may liaise with the refuelling operator to modify the instruction. Again, this typically requires a face-to-face discussion with the refuelling operator.

On occasion, the pilot may not be on board the aircraft at the time of completion of refuelling, or may be engaged in undertaking other tasks. Accordingly, the refuelling operator may need to wait before he can confirm to the pilot that refuelling has been completed. In these circumstances, the refuelling agent may be detained, and subsequent refuelling of another aircraft may be delayed. Obviously this is undesirable.

The quantity of fuel required for an aircraft to safely undertake a particular flight is typically calculated in terms of the mass of fuel required, rather than in terms of a volume of fuel. The metering equipment used by refuelling operators typically measures the volume of fuel dispensed. As a number of factors such as the formulation of the fuel, and the ambient air temperature, the altitude of the airport and the like can affect the fuel density, it will be appreciated that the relationship between the mass and volume of the fuel can be relatively complex. Typically, a simple conversion factor is used to convert between mass and volume. The simple conversion factor will typically err on the side of caution so as to ensure that at least the required fuel quantity is present. However, as the simple conversion factor may not take into account variables such as those mentioned hereinbefore, it is common for the quantity of fuel actually dispensed to an aircraft to be greater, sometimes significantly greater, than the mass of fuel required. This carries with it significant inefficiencies. Firstly, since a greater quantity of fuel is dispensed than is actually required, the refuelling process may take longer than required. Secondly, the additional weight of fuel carried by the aircraft results in the efficiency of the aircraft being reduced, and in increased fuel usage. Furthermore, an airline may have more funds tied up in fuel that is strictly necessary.

A number of systems are known that are intended to streamline the refuelling process, to enhance the efficiency thereof. By way of example, U.S. Pat. No. 7,376,495 describes a system in which flight data including fuel planning information is supplied from a planning system via a gateway to a fuelling data server. Refuelling instructions are supplied from the fuelling data server to a refuelling agent who, if he is able to accept the instructions, actions them to dispense fuel to an aircraft. Upon completion of the refuelling operation, the refuelling agent notifies the fuelling data server. In some arrangements, the U.S. Pat. No. 7,376,495 system results in the generation of a printed ticket that can be passed to the pilot to indicate that fuelling has been completed, and showing how much fuel has been dispensed to the aircraft. U.S. Pat. No. 7,376,495 also discloses the possibility of transmitting data to the aircraft cockpit to show that fuelling has been completed and showing how much fuel has been dispensed.

Whilst the arrangement of U.S. Pat. No. 7,376,495 is beneficial in that certain communications are streamlined and so the refuelling process may be of enhanced efficiency, the applicant believes that there is still considerable scope for further enhancement of the system, for example to permit greater flexibility and control over the refuelling process, and to allow greater control over the quantity of fuel dispensed to an aircraft.

Other documents describing refuelling systems include DE2314728 and U.S. Pat. No. 6,175,382 which both relate to the refuelling of cars or the like on a garage forecourt. In these arrangements, the refuelling process is typically undertaken by the driver of the vehicle, the described systems simply allowing monitoring of the refuelling process from a remote location. WO2005/069944 relates to the refuelling of aircraft, describing an arrangement in which, upon completion of refuelling, the aircraft pilot is sent an electronic receipt or ticket detailing the quantity of fuel supplied to the aircraft.

Accordingly, it is an object of the invention to provide a refuelling method and system whereby at least some of the disadvantages associated with known refuelling arrangements are overcome or are of reduced effect, by providing refuelling information in substantially real-time.

According to one aspect of the invention there is provided a refuelling method comprising instructing a refuelling operator to dispense a quantity of fuel to a tank associated with an apparatus, and maintaining, during dispensing of the fuel, at least intermittent, substantially real time communication with an officer responsible for the apparatus to advise the officer of the status of the refuelling process, wherein the communication with the officer is a two-way communication, allowing the officer to modify the instruction to dispense a quantity of fuel whilst fuel is being dispensed.

The apparatus may comprise, for example, an aircraft, train, ship or other fuel using device.

The communication is preferably undertaken by way of a wireless communications link. By way of example, the communications link may take the form of a cellular telephone communications link. Alternatively, it may be by means of a wireless local area network or the like. Other forms of communications link such as a low power microwave (Bluetooth or the like) link may be used.

It will be appreciated that an arrangement of this type is advantageous in that changes may be made to the quantity of fuel to be dispensed during the fuelling process. As a result, such changes may be actioned quickly. The refuelling process may thus be shortened. By using a wireless communications link, there is no need for the refuelling operator and the officer to be face-to-face in order for the instructions to be given, or for confirmation that fuelling has been completed to be given. Again, this may result in enhanced efficiencies. By providing the officer with substantially real-time information regarding the status of the fuelling process, the officer will have more accurate knowledge of when the fuelling process will be completed, which may aid the scheduling of other procedures.

The invention further relates to a system for use in the method described hereinbefore, comprising a refuelling module and an officer module, the refuelling module being configured to receive instructions to dispense a quantity of fuel to an apparatus, an at least intermittent, substantially real time communications link being maintained between the refuelling module and the officer module during dispensing of fuel, the refuelling module being adapted to transmit to the officer module information relating to the status of the refuelling process, and the officer module being adapted to display to an output indicative of the status of the refuelling process, wherein the communications link is a two-way communications link allowing the officer module to send modified refuelling instructions to the refuelling module during refuelling.

The communications link is conveniently a wireless link. By way of example it may be established by way of a cellular telephone communications system. Alternatively, it may be established by means of a wireless local area network or the like.

The officer module conveniently includes input means by which a modified refuelling instruction can be input, the officer module transmitting information relating to the modified refuelling instruction via the communications link to the refuelling module.

The refuelling module is preferably further arranged for communication with a control station whereby the initial refuelling instruction is transmitted to the refuelling module. During fuelling, the refuelling module preferably transmits refuelling data to the control station, substantially in real time. Accordingly, the dispensing of fuel can be monitored remotely, if desired. Upon completion of refuelling, not only is the officer module notified that refuelling is complete, with information indicative of the quantity of fuel dispensed supplied to the officer module, but also the control station is notified that refuelling has been completed, and information relating to the quantity of fuel dispensed supplied thereto. The information supplied to the control station may be stored to form a log demonstrating that fuelling of the aircraft has been completed. It may further be used in the generation of invoicing and/or accounts information, potentially allowing the use of a paperless records and accounts system. Furthermore, it may be used to track the quantity of fuel remaining in the tanker or the like used to dispense fuel to the apparatus, and so may be used in controlling the selection of which tanker or the like to use to dispense fuel to each apparatus, and to advise the operator when the tanker or the like requires refilling. It will be appreciated that the control station may receive refuelling data representative of the refuelling of a number of apparatuses, such as a number of aircraft in an airline's fleet. From a remote location, an operator may, if desired, undertake analysis of the fuel usage of an individual aircraft, a group of aircraft or, indeed, the entire fleet, regardless as to the locations of the aircraft, and the information analysed may be substantially real time, live data. In this manner, analytics and trending data regarding refuelling undertaken in particular locations, for particular routes, or of particular aircraft can be undertaken, if desired. The invention thus enables an enhanced level of data capture and analysis to be undertaken.

The refuelling module is preferably adapted to receive information from a fuel metering device monitoring the volume of fuel dispensed from the tanker. In a simple arrangement, this may be achieved through an operator keying in information from a display associated with the metering device. However, preferably, the refuelling module receives this information directly, reducing the risk of input errors and further streamlining the process. By way of example, data may be transmitted to the refuelling module via a low powered microwave communications link.

As mentioned hereinbefore, the density of the fuel, and other factors, may need to be taken into account in order to accurately determine, from a reading of the volume of fuel dispensed, the corresponding mass of fuel dispensed. Accordingly, the metering device may incorporate a sensor adapted to monitor, substantially in real-time, the density of fuel being dispensed. Alternatively, a separate density sensor may be provided, the output of which is used to allow accurate determination of the mass of fuel dispensed by the metering device. The refuelling module conveniently uses both the density measurement and the volume measurement to determine the mass of fuel dispensed, and the officer module is adapted to display the determined mass of fuel dispensed.

It will be appreciated that by employing a density sensor in this manner, variations in the formulation of the fuel, ambient temperature, fuel water content and other factors can be taken into account, allowing a required quantity of fuel to be dispensed to the aircraft in an accurate manner.

The invention further relates to a refuelling module and to an officer module for use in the system.

The invention will further be described, by way of example, with reference to the accompanying drawing, FIG. 1, which is a schematic diagram illustrating a system in accordance with an embodiment of the invention.

The system illustrated in FIG. 1 is intended for use at an airport for use in the refuelling of aircraft at the airport. The system comprises, in this embodiment, a fuel reservoir that in this case takes the form of a hydrant dispenser, fuel tanker 10 or the like including a fuel metering device 12 operable to monitor a volume of fuel dispensed to an aircraft 14.

Associated with the fuel metering device 12 is a density sensor 16 operable to monitor the density of the fuel being dispensed. A wide range of fuel metering devices 12 are known, and so no further description of the precise device used in the embodiment illustrated is included herein. Likewise, a range of devices suitable for use in monitoring the density of the fuel being dispensed are known.

Whilst the arrangement illustrated includes a fuel tanker 10 from which fuel is dispensed to the aircraft 14, it will be understood that the invention is not restricted in this regard, and that there are other forms of fuel reservoir from which fuel may be dispensed to an aircraft, and the invention is applicable to all such arrangements.

Associated with the fuel tanker 10 is a refuelling module 18, for example in the form of a tablet computer or the like, that is adapted to communicate with the fuel metering device 12 and the density sensor 16 so as to be supplied with information, substantially in real time, relating to the volume and density of the fuel so far dispensed to the aircraft 14 since the commencement of refuelling. The refuelling module 18 is preferably of rugged form so as to be able to withstand the harsh treatment to which it will be likely to be exposed, in use. In some arrangements, the refuelling module 18 may be hard-wired to the fuel metering device 12 and density sensor 16. However, conveniently it is arranged to receive information from the fuel metering device 12 and from the density sensor 16 by way of a wireless communications link, such as a low powered microwave communications link. It will be appreciated that the communications techniques mentioned hereinbefore allow the refuelling module to receive information relating to the refuelling of the aircraft in an automatic fashion. This need not always be the case and, if desired, the refuelling module may incorporate data input means whereby an operator can manually input information relating to the volume of fuel dispensed and the density thereof.

The refuelling module 18 includes wireless communications means 18a allowing the transmission of data therefrom and reception of data from remote locations. The wireless communications means 18a may be established by means of, for example, a cellular telephone system whereby data can be transmitted, or by means of a wireless local area network 20a or the like, or could comprise a combination of these communications means. In addition, if desired, if the refuelling module 18 is used in a location at which a suitable cable infrastructure is provided, the communications may be by way of a wired communications link.

The communications means 18a allow the refuelling module 18 to communicate with a remote control station 20 to allow instructions transmitted from the control station 20 to be received by the refuelling module 18 and to allow the transmission of data from the refuelling module 18 to the control station 20.

Furthermore, the communications means 18a allow the refuelling module 18 to communicate with an officer module 22. The officer module 22, which may comprise, for example a tablet computer or the like, is intended to be operated by the pilot or another officer of the aircraft 14. The officer module 22 is adapted to receive data transmitted by the refuelling module 18, in use, and to allow data to be transmitted from the officer module 22 to the refuelling module 18. The officer module 22 may be securely mounted within the aircraft cockpit or, alternatively, may comprise a portable unit carried by the officer.

In use, the control station 20 is provided with data indicative of the flight plan to be followed by an aircraft and the quantity of fuel that the aircraft 14 will require in order to safely complete the planned flight. The information may be derived from a range of data sources 20b. It is also provided with information regarding the location of the aircraft 14 on the airport, the locations of a number of fuel tankers 10 and the quantities of fuel carried thereby. Using this information, the control station 20 identifies an appropriate one of the tankers 10 to use in refuelling of the aircraft 14 and instructs the operator thereof, via the refuelling module 18, that he is to attend the aircraft 14. On receipt of the instruction, the operator may acknowledge receipt of the instruction and attend the aircraft 14 and the quantity of fuel to be dispensed thereto. If desired, once at the location of the aircraft, he may input identification details relating to the aircraft in order to serve as a double check that he is attending the correct aircraft.

Next, using the information supplied by the control station 20, the operator commences refuelling of the aircraft 14, dispensing to the aircraft the quantity of fuel specified in the instructions supplied by the control station 20. Information relating to the refuelling process is transmitted, substantially in real time, by the communications means 18a, and the officer module 22 uses this information to output on a display thereof the quantity of fuel dispensed. The displayed information may further include an indication of the requested quantity of fuel, and show in a graphic form the progress of the refuelling process.

It will be appreciated that the pilot or other officer using the officer module 22 is thus appraised, substantially in real time, of the status of the refuelling process. The information can be provided to the pilot or other officer, regardless as to the location of the pilot or other officer, and there is no need for the pilot or other officer to significantly interrupt other tasks that he may be undertaking to ascertain how the refuelling process is progressing.

During refuelling, the control station 20 also receives the information relating to the status of the refuelling process, and so refuelling can be monitored from the control station 20, or from another remote location receiving data from the control station 20, substantially in real time.

If, during the course of dispensing fuel to the aircraft, the pilot or other officer determines that the initially instructed fuel quantity is no longer appropriate, for example as a result of a change in the flight plan or loading of the aircraft, then the pilot or other office can, using the officer module 22, transmit an updated instruction to the refuelling module 18 indicating a revised quantity of fuel to be dispensed. The revised quantity of fuel to be dispensed may be greater than or less than the quantity initially instructed. Upon receipt, the operator can modify the dispensing of fuel accordingly. It will thus be appreciated that the use of the invention allows modifications to the quantity of fuel to be dispensed during the refuelling process with the pilot or other officer located remotely of the operator undertaking the refuelling process. Modifications to the required fuel levels can thus be processed efficiently.

The refuelling module 18 may be arranged to send a signal to the fuel tanker 10 or other dispenser when it is determined that the desired quantity of fuel has been dispensed, or as the desired quantity is approached, in order to terminate the dispensing of fuel in an automated or semi-automated manner once the desired quantity of fuel has been dispensed. In this manner, the dispensing of additional fuel beyond the required quantity can be avoided or reduced.

Upon completion of the refuelling process, the refuelling module 18 transmits to the officer module 22 an indication that refuelling has been completed, providing an indication of the quantity of fuel dispensed. This transmission may take the form of an electronic equivalent to the printed ticket typically provided by a refuelling agent upon the completion of fuelling. Again, it can be transmitted without requiring the operator and the pilot or other officer to be in the same location as one another, and does not require the operator to interrupt other tasks being undertaken by the pilot or other officer. Efficiency can thus be enhanced.

Additionally, at the completion of fuelling, the refuelling module 18 transmits to the control station 20 details of the quantity of fuel dispensed to the aircraft 14, including any modifications to the initial fuelling instruction. This information can be stored to provide a log confirming that a required quantity of fuel has been dispensed to the aircraft 14. It may also be used to update information held by the control station regarding the quantity of fuel contained by that one of the tankers 10. Furthermore, it may be used by an invoicing or accounts system to generate an invoice or accounts entry for the operator of the aircraft 14 without requiring manual intervention.

It will be appreciated that the system set out hereinbefore is advantageous in that it allows the refuelling process to be streamlined, allowing a desired quantity of fuel to be dispensed, and allowing updating of the required fuel quantity during dispensing. As modifications to the quantity of fuel to be dispensed can be made in real time, the refuelling process can be completed quickly and efficiently. It avoids the need for face-to-face meeting of the refuelling operator and the pilot or other officer. Accordingly, time typically spent trying to locate the pilot or other officer, and the inconvenience of interrupting other procedures he may be undertaking is avoided. Time savings, both for the turnaround of the aircraft and for the refuelling operator may thus be made. Furthermore, as the pilot or other officer has up-to-date, substantially real time information relating to the refuelling process, he is in a better position to provide accurate scheduling or departure information.

By avoiding the need for unnecessary manual data entry, records can be kept with a good degree of accuracy. Invoices can be generated with a high degree of accuracy and in an efficient manner.

As mentioned hereinbefore, instructions provided regarding the quantity of fuel to dispense to an aircraft typically instruct the operator to dispense a certain mass of fuel. However, the metering device 12 is typically designed to monitor the volume of fuel dispensed. As a number of factors can influence the mass of a given volume of fuel, for example the formulation of the fuel, the quantity of water or other contaminants contained therein, the ambient air temperature, and the like, in accordance with the invention the data provided to the officer module 22 by the refuelling module 18 conveniently uses the output of the metering device 12 and the density meter 16 in combination to derive the mass of fuel dispensed. By taking into account density variations in this manner, in addition to avoiding over fuelling by terminating fuelling in an automated fashion once the required quantity of fuel has been dispensed, over fuelling of aircraft through miscalculation of the volume of fuel to be dispensed may be reduced. Not only does this result in the refuelling process being streamlined through avoiding unnecessarily lengthening of the refuelling process, but also aircraft efficiency is enhanced through avoiding requiring the aircraft to carry a greater quantity of fuel than is actually required.

The fuel density information is preferably used substantially in real time in order to minimise inaccuracies in fuel metering during dispensing. However, as sudden variations in fuel density are unlikely to occur, the fuel density information used may be read periodically, for example just at the commencement of dispensing of fuel to the aircraft.

In the description set out hereinbefore, certain functions of the control station 20 are described. However, it will be appreciated that the control station 20 may, additionally undertake a number of additional functions. Whilst the control station 20 may, in some applications, take the form of a single computer, it is envisaged that it will conveniently take the form of or its functionality be implemented by a cloud application which is fully distributed, globally, in real-time and can be scaled globally on demand or as needed. It may be arranged to manage employee shifts and track absence data as well as maintaining training records to ensure only appropriately qualified personnel are allowed to fuel certain aircraft types. It may dynamically create and maintain a schedule for the current day, for example scheduling which tankers 10 or the like are to be used to refuel which aircraft, in realtime, updating the schedule, as required, to take into account unforeseen changes.

The application conveniently provides forward resource planning information based on the planned forward scheduling information, staff availability and training as well as historic actual information on timings and activities accumulated over time as described hereinbefore. As mentioned hereinbefore it preferably manages refuelling vehicle information and capabilities, so as to be able to assist in the maintenance and resource scheduling as well as ensure that the correct vehicle is provided to a specific assignment, and it may manage customer information so as to provide data reconciliation and invoicing functions. It may provide fuel tendering functionality enabling airlines to tender for their fuel from the oil company or fuel broker.

Within the application, data relating to different customers, airlines and refuellers are maintained in an isolated fashion to ensure that no cross contamination can occur.

The application preferably provides automated data reporting functions to allow users to report on their information in graphical or tabular form, and may allow exporting of the raw data for use by other applications. It may incorporate powerful analytics tools or functions to allow users to determine complex relationships and trends within their refuelling data and report on these and use this enhanced information within scheduling and resource planning.

The application may provide vehicle telematics from each connected vehicle including, for example, vehicle position, speed, emissions, accelerations, journey times. This data may be viewed in real-time and stored to allow historic data to be viewed and reported upon, when desired. The position data may be used in geo-fencing behaviour to provide alerts and report on different behaviours based on vehicle position. This information may be used in dynamic scheduling and allocation as mentioned hereinbefore.

The application may further enable integrated Voice over IP communications between any party in the system where allowed by access control rules.

Alongside providing analytics and trending functionality, the application may enable behavioural analysis of the refuelling operators to be undertaken. Similarly, pilot behaviour and control operator behaviour may be analysed, and the results of the analysis may be fed back to, for example, management functions within relevant organisations.

As mentioned before, all data captured is preferably stored and backed up in order to maintain required data for audit or historic reporting purposes.

The application may be arranged to self-learn and update the configuration of aspects thereof using the trending and analytics outputs, for example to optimize efficiency. Using both input and learned data, the application can self-allocate fuel orders to the next operator in the most efficient way taking into account the complete situational awareness picture, leading to refuelling agent business efficiency.

The application is preferably arranged so as to integrate with existing systems used by airlines, airports, global (such as A-CDM) systems and other third party IT systems (such as time and attendance systems) so as to blend the application data into a single, integrated picture of the data needed for the operations thereof.

It will be appreciated that as the invention may be employed in the vicinity of highly flammable materials, and in environments in which a considerable level of critical wireless communications are being undertaken, it is important that the system is designed in such a manner as to avoid the formation of a safety risk and to avoid interfering with such communications.

Whilst the description hereinbefore relates to an arrangement used at a single airport, it will be appreciated that the invention may be expanded for use at a number of locations, and may be used by a number of airlines. Where used at a number of locations, it will be appreciated that certain parts of the system may be centralised, for example the control station 20, or elements thereof, may be centralised, and the invoicing functions provided thereby may be centralised. Obviously, other parts of the system cannot be centralised as the refuelling operators will need to be located at each airport in which the invention is employed. As the control station 20 receives refuelling data relating to a number of aircraft at a number of locations, it will be appreciated that analysis of the refuelling data may be undertaken, for example to derive data regarding the overall fuel levels of all of the aircraft in the airline's fleet, regarding refuelling undertaken in specific locations, or in relation to aircraft on specific routes, or relating to the refuelling of specific aircraft. Such analysis may be undertaken substantially in real time regardless as to the locations of the aircraft. It will be appreciated that the invention allows enhanced data capture and analysis to be performed.

Whilst the description hereinbefore relates primarily to the refuelling of aircraft, it will be appreciated that the invention is not restricted to such use and may be employed in a range of other applications, such as in the refuelling of ships or trains, or in the supply of fuel to other fuel using apparatuses. Whilst the description hereinbefore is of one implementation of the invention, it will be appreciated that a number of modifications and alterations may be made to the arrangement described hereinbefore without departing from the scope of the invention as defined by the appended claims.

The invention claimed is:

1. A method of refuelling an aircraft having a cockpit, the method comprising: receiving and storing a refuelling instruction at a control station that includes a wireless transceiver; providing an officer module in the cockpit of the aircraft, the officer module including at least an input device and a wireless transceiver; providing a refuelling module including a wireless transceiver; establishing and maintaining two-way wireless communications between the wireless transceivers of each of the control station, the refuelling module and the officer module during an ongoing refuelling process for the aircraft; transmitting, using the wireless transceivers, the refuelling instruction from the control station to the refuelling module, the refuelling instruction instructing a performance of a refuelling process involving dispensing a quantity of fuel to a fuel tank of an aircraft; transmitting, using the wireless transceivers, the refuelling instruction from the control station to the officer module; providing a real-time status of the ongoing refuelling process from the refuelling module to the officer module using the wireless transceivers of the refuelling module and the officer module; selectively receiving a modification to the refuelling instruction from the input device of the officer module; transmitting the modified refuelling instruction from the officer module to the refuelling module using the wireless transceivers to instruct the performance of a modified refuelling process involving dispensing of a modified quantity of fuel to the fuel tank of the aircraft; transmitting the modified refuelling instruction from the refuelling module to the control station upon completion of the modified refuelling process; and updating the stored refuelling instruction at the control station based on the modified refuelling instruction.

2. The method according to claim 1, wherein the two-way wireless communications connection includes at least one of a cellular telephone communications link, a wireless local area network or a low powered microwave communications link.

3. A refuelling system configured to implement the aircraft refuelling method of claim 1, the system comprising the refuelling module and the officer module of claim 1, wherein the refuelling module includes a refuelling module communications component configured to receive instructions to dispense a quantity of fuel to an aircraft, via a wireless communications link being maintained between the refuelling module and the officer module during dispensing of fuel to the aircraft, the refuelling module being adapted to transmit to the officer module real-time information relating to a status of the ongoing refuelling process, and the officer module including an officer module communications component adapted to display an output indicative of the status of the refuelling process, wherein the communications link established between the refuelling module communications component and the officer module communications component is a two way communications link allowing the officer module to, via direct communication with the refuelling module, transmit to the refuelling module a modified instruction to dispense a modified quantity of fuel, while fuel is being dispensed.

4. The refuelling system according to claim 3, wherein the wireless link includes at least one of a cellular telephone communications system, a wireless local area network, or a low powered microwave communications link.

5. The refuelling system according to claim 3, wherein the officer module includes the user input by which the modified refuelling instruction can be entered and instructed to be sent from the officer module communications component to the refuelling module communications component.

6. The refuelling system according to claim 3, wherein the refuelling module is further configured for communication with a control station from which the initial refuelling instruction is transmitted to the refuelling module.

7. The refuelling system according to claim 6, wherein the system is configured such that upon completion of refuelling the officer module is notified that refuelling is complete, the control station is notified that refuelling has been completed, and information relating to the quantity of fuel dispensed is supplied thereto.

8. The refuelling system according to claim 7, wherein the control station is configured such that the information supplied to the control station is stored to form a log demonstrating that fuelling of the aircraft has been completed.

9. The refuelling system according to claim 7, wherein the control station is configured such that the information supplied to the control station is used in the generation of at least one of invoicing information and accounts information.

10. The refuelling system according to claim 7, wherein the control station is configured such that the information supplied to the control station is used for data analysis purposes.

11. The refuelling system according to claim 3, wherein the refuelling module is configured to receive information from a fuel metering device that monitors the volume of fuel dispensed, and from a sensor adapted to monitor the density of fuel being dispensed.

12. The refuelling system according to claim 11, wherein the refuelling module is configured to use both the density measurement and the volume measurement to determine the mass of fuel dispensed, and to report at least the mass of fuel dispensed to the officer module over the communication link between the refuelling module and the officer module, and wherein the officer module is adapted to display the determined mass of fuel dispensed.

\* \* \* \* \*